F. STELTER.
DRY CLEANING MACHINE FOR GLOVES.
APPLICATION FILED SEPT. 28, 1912.
1,063,841.
Patented June 3, 1913.
2 SHEETS—SHEET 2.
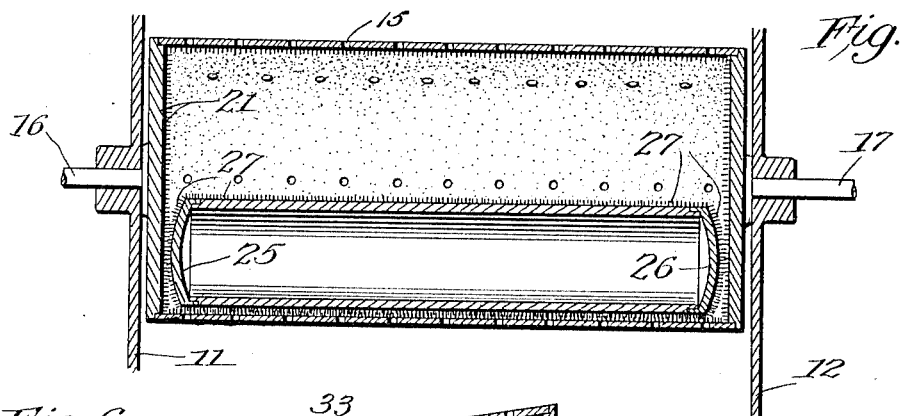
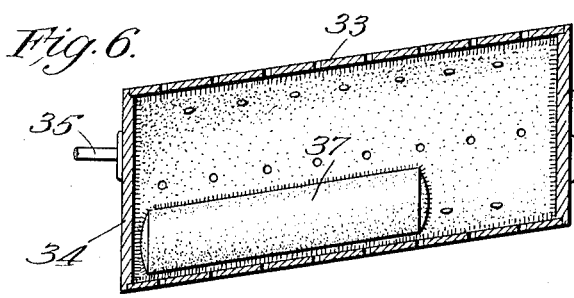
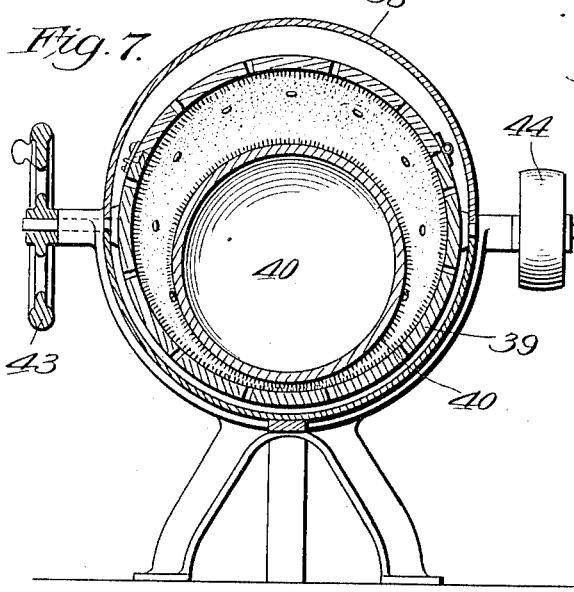
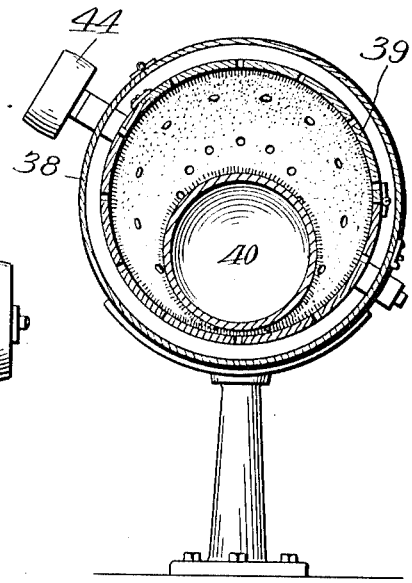
Inventor
Francis Stelter
Witnesses
Attorneys

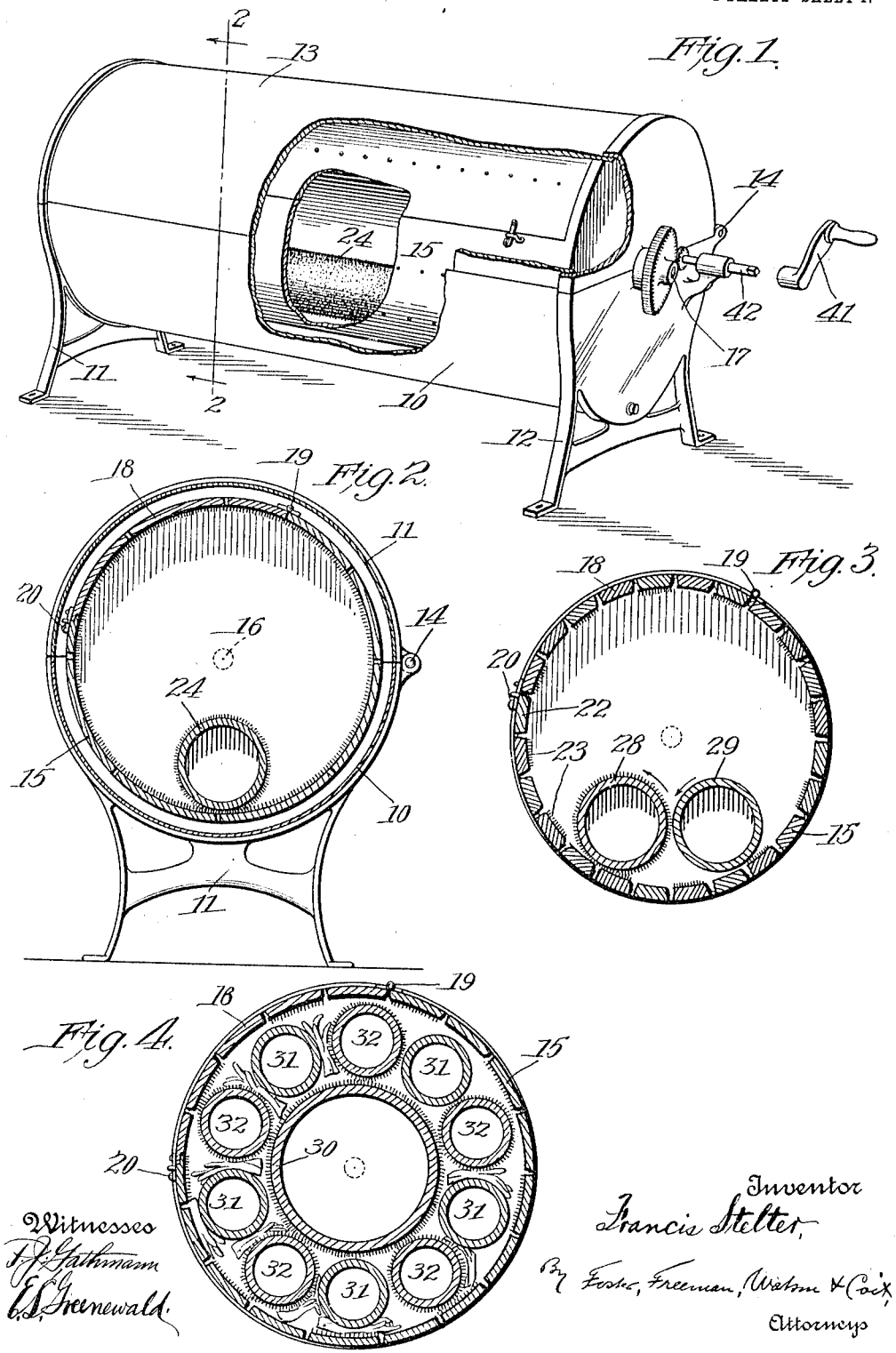

UNITED STATES PATENT OFFICE.

FRANCIS STELTER, OF LONG ISLAND CITY, NEW YORK, ASSIGNOR TO VOLVOX MACHINE COMPANY, INC., OF NEW YORK, N. Y., A CORPORATION OF NEW YORK.

DRY-CLEANING MACHINE FOR GLOVES.

1,063,841.   Specification of Letters Patent.   Patented June 3, 1913.

Application filed September 28, 1912. Serial No. 722,901.

*To all whom it may concern:*

Be it known that I, FRANCIS STELTER, a citizen of the United States, residing at Astoria, Long Island City, New York, have invented certain new and useful Improvements in Dry-Cleaning Machines for Gloves, of which the following is a specification.

This invention relates to cleaning machines and more particularly to a machine for cleaning gloves and similar small articles of apparel.

One of the objects of the invention is to effectively clean an accumulation of dirt, grease, etc., from gloves without danger of tearing the same.

Another object is to provide a simple machine which can readily clean a large number of gloves.

Other objects and the novel features of the invention will be apparent from the folllowing description taken in connection with the drawings, in which:

Figure 1 is a perspective view, parts being broken away showing one form of my invention. Fig. 2 is a transverse cross section of the machine along line 2—2 of Fig. 1. Fig. 3 is a transverse cross section of a cylinder showing a modification of the brushing arrangement of the same. Fig. 4 is a transverse cross section of a cylindrical receptacle showing a still further modification. Fig. 5 is a vertical longitudinal sectional view of the machine shown in Fig. 1. Fig. 6 is a longitudinal section of a modified form of cylinder arranged to move the material and loose brushing member within the cylinder longitudinally of the same. Figs. 7 and 8 are central cross sectional views illustrating another modification of the invention.

The invention comprises generally an outer casing in which an inner receptacle is revolubly mounted. The inner receptacle is provided to contain the article to be cleaned and has loosely mounted therein one or more brushing and rubbing members which coöperate with the inner surface of the cylinder to clean the gloves or other articles.

Referring to the drawings, Fig. 1 shows a perspective view of the machine, in which the outer casing is made in two halves, the lower half 10 being supported by suitable standards 11 and 12 and the upper half 13 of the casing being hinged or pivoted at 14 to the lower half and inclosing the inner receptacle or container 15. The outer casing is usually formed from sheet metal and the two halves with the heads formed at the ends constitute an inclosing cylinder. The container or receptacle 15 is cylindrical in shape and has stub shafts 16 and 17 secured to its opposite ends to rotatably mount the cylinder in the heads of the stationary casing. In order to have access to the interior of the receptacle cylinder 15 the same is provided with an opening closed by the door 18 hinged at 19 and provided with a latch 20. The cylinder 15 in the present invention is provided on its interior surface, both the cylindrical part and the heads of the same, with brushing bristles 21 or other suitable brushing elements such as come on wire webs, may be secured therein in any ordinary or preferred way. Fig. 3, however, illustrates a very desirable arrangement of brushing devices on the inner surface of the cylinder 15. In the arrangement as shown the cylinder is built up of a number of slightly separated longitudinally disposed staves forming a pervious cylinder so that the benzin, which is contained in the outer casing, may enter the entire length of the cylinder 15 and splash over the gloves therein. If preferred, the cylinder 15 may be perforated as indicated. Certain of the staves 22 have smooth inner surfaces while alternating with the smooth-faced staves there are provided staves 23 which have bristles set therein. The inner casing 15 is constructed of wood, no metal being used or exposed on the interior as the machine is used for dry "benzin" cleaning. By the arrangement of alternate smooth staves and brushing staves I am enabled to obtain a rubbing as well as brushing action. The staves are rounded and smooth, and prevent the sudden descent of the gloves or other articles while the cylinder is rotating and thus prevent the gloves from bunching. All of the staves may of course be provided with brushing bristles, but this arrangement will not maintain such an even distribution of the articles to be cleaned.

As shown in Figs. 1 and 2 the revolving cylinder 15 has a cylindrical brushing member 24 loosely mounted therein. The cylinder 24 is preferably constructed of wood and the cylindrical surface, as well as the curved end surfaces of the caps 25 and 26 thereof are provided with bristles 27, and the cylinder 24 runs loosely inside the cylinder 15, the caps 25 and 26 being covered with bristles. Any gloves caught or moving past the ends of the cylinder 24 will be properly brushed and cleaned.

Instead of a single brush I may provide two brushes as shown in Fig. 3. One of the brushes, 28, corresponds to the brush 24 shown in Figs. 1, 2 and 5, while the other brush 29 is a smooth, hollow, wooden roller similar in construction to the roller brushes 24 and 28 except that the exterior surface thereof is not covered with bristles. It will be noted that no matter in which direction the cylinder 15 revolves the rollers 28 and 29 will rotate in the same direction. However, the surfaces at their contact areas will move in opposite directions and thus produce an effective rubbing action on the gloves passing between.

In Fig. 4 I have shown a further modification of the construction described in which there is a comparatively large central roller brush 30 loosely supported at about the center of the cylindrical receptacle 15 by a plurality of smooth wooden rolls 31 and brushes 32. The brush roll 30 has bristles on its exterior surface and is similar in construction to rolls 24 and 28 as are also rolls 32. The rolls 31 are similar in construction to the roll 29 shown in Fig. 3 having a smooth exterior surface. The rolls 31 and 32 are disposed between the inner surface of the cylinder 15 and the exterior surface of the brush roll 30 and alternate, but such an arrangement is not essential.

A modification is illustrated in Fig. 6 by means of which the articles and the brush within the cylinder 33 will rotate and also move longitudinally therein along the brushing surface and thereby effectively brush and clean the articles because they will be more readily distributed over the interior of the cylinder not having an opportunity to bunch in any one place. To this end the cylinder 33 is constructed so that the heads 34 thereof will be disposed at an angle to the cylindrical body. The stub shafts 35, 36 are secured thereto in line and the loose brush roll 37 within will upon rotation of the cylinder 33 move back and forth between the heads 34, 34. The cylinder 33 is of course provided with an outer casing as is the cylinder 15.

In Figs. 7 and 8 there is shown a further modification of the invention in which the outer casing 38, as well as the inner receptacle 39, are substantially spherical or globular in shape. The container 39 is provided with a hinged door as in the cylindrical casing and the interior thereof is covered with bristles. A ball brush 40 which has bristles on its exterior surface works loosely in the receptacle 39, and as in the cylindrical casing, the contact between the ball and container will tend to rotate the loosely mounted brush and exert a brushing and rubbing action. In Fig. 7 the receptacle 39 has stub shafts by means of which it is horizontally and rotatably mounted in the casing 38. In Fig. 8 the shaft is disposed at an angle to the horizontal or vertical and as the receptacle 39 rotates the ball brush 40 in Fig. 8 will have, in addition to its tendency to roll to the lowest point in the spherical receptacle 39, a spinning motion moving the said ball upwardly due to its contact with the bristles on the interior surface of the receptacle 39. The ball 40 will therefore have a motion of translation as well as a rotary motion, and in fact, all of the loose brushing members shown will be moved bodily as well as rotated. To provide the proper motion for the receptacle 15 a crank 41 is provided which operates a shaft 42 connected by gearing to the stub 17. By means of this crank or any other preferred device a rotating and oscillating motion may be imparted to the receptacle 15. I prefer to rotate the receptacle 15 a half turn and then oscillate the same a few times, rotate it another half turn, oscillate again a few times and so on. I find that this arrangement will speedily clean the articles. For this motion it may be desirable to substitute a movement in which the receptacle is rotated in one direction for about six times and then reversed and rotated in the opposite direction about six times and then reversed again and so on. A crank 43 is provided for rotating the spherical receptacle 39 in the manner indicated for the container 15. If it is desired to rotate the receptacles continuously a pulley 44 may be provided.

From the foregoing the operation of the device will be apparent. It will be seen that I have provided a machine for the purpose described which has no complicated mechanism and in which a large number of gloves may be cleaned in a comparatively short time without breaking or tearing or otherwise injuring them. In dry cleaning with benzin, which is used in this device, it is essential that there shall not be any shafts or rotating elements within the receptacle containing the articles to be cleaned. By my arrangement I have eliminated any possibility of the kid gloves being caught in any part of the apparatus.

It will be obvious that various modifications within the scope of the claims may be devised without departing from the spirit of the invention and it is therefore not intended to limit the invention to the construction as shown and described.

Having thus described the invention what is claimed as new is:

1. In a cleaning machine of the class described, the combination of a rotatable perforate receptacle built up of spaced members, certain of said spaced members having brushing means on their inner surfaces and, with the inner surfaces of the other members, forming a continuous cylindrical surface, and a cylindrical element loosely mounted in the receptacle and having brushing means on its outer surface, substantially as and for the purpose described.

2. In a cleaning machine of the class described, the combination of a rotatable receptacle having a uniform curved interior surface and brushing elements arranged on said surface, a curved member contained in the receptacle having brushing elements on its entire convex surface, said member being freely movable in the receptacle, the brushing elements thereon coöperating with the brushing elements of the receptacle to clean articles introduced into the receptacle.

3. In a cleaning machine for gloves and the like, the combination of a receptacle having a continuous curved interior surface provided with brushing means, and a member loosely mounted in the receptacle and having brushing means on its exterior surface, substantially as described.

4. In a cleaning machine for gloves, the combination of a cylindrical receptacle having brushing means on its interior surface, a cylindrical member loosely mounted in the receptacle, said member being nearly the length of the interior of the receptacle and having brushing means on its entire exterior surface, including the ends, substantially as described.

5. In a dry cleaning machine for gloves, the combination of a movable receptacle having brushing elements on its interior surface, a member loosely carried in said receptacle and having brushing means on its exterior surface, and another member having a smooth exterior surface and also being loosely mounted in the receptacle, said members coöperating with each other and the receptacle when the latter is moved, substantially as and for the purposes described.

6. In a dry cleaning machine for gloves, the combination of a rotatable receptacle having brushing elements on part of its interior surface and a part of said interior surface being smooth, a rotatable member loosely mounted in said receptacle and having the exterior surface thereof covered with brushing means, another rotatable member loosely mounted in said receptacle and having a smooth exterior surface, said members coöperating with each other and the receptacle, and means for rotating said receptacle, substantially as and for the purpose described.

7. In a dry cleaning machine for gloves, the combination of a receptacle having brushing means on its interior surface, a member disposed out of contact with said receptacle and having brushing means on its exterior surface, a series of elements arranged between said member and the interior surface of the receptacle and coöperating therewith, substantially as described.

8. In a dry cleaning machine for gloves, the combination of a receptacle having a curved inner surface and brushing means thereon, a member disposed out of contact with said receptacle and having brushing means on its exterior surface, a series of loosely mounted elements arranged between the interior surface of the receptacle and said member and supporting the latter in its out-of-contact position, certain of said elements having brushing means thereon and others having smooth exterior surfaces, and means for rotating the receptacle for the purpose described.

9. In a dry cleaning machine for gloves, the combination of a receptacle circular in cross section and having bristles on its inner curved surface, a member carried loosely within said receptacle, said member being circular in cross section, corresponding in shape to said receptacle and having bristles on its exterior surface, and means for imparting motion to the receptacle, for the purpose set forth.

10. In a dry cleaning machine, the combination of a hollow rotatable circular receptacle, and a circular body within the receptacle and rolling freely on the bottom thereof, one of said circular members having brushing elements on its surface which contacts with the other circular member.

11. In a dry cleaning machine, the combination of a hollow rotatable cylinder, and a second cylinder within the rotatable cylinder and rolling freely on the bottom thereof, one of said cylinders having brushing elements on its surface which contacts with the other cylinder.

In testimony whereof I affix my signature in presence of two witnesses.

FRANCIS STELTER.

Witnesses:
WILLIAM A. UHL,
LENA STELTER.

---

Copies of this patent may be obtained for five cents each, by addressing the "Commissioner of Patents, Washington, D. C."